United States Patent [19]
Zajac

[11] 3,910,476
[45] Oct. 7, 1975

[54] KEYED PUSHER TUBE AND COLLET ASSEMBLY

[76] Inventor: Chester S. Zajac, 8010 Sierra Oval, Parma, Ohio 44130

[22] Filed: Apr. 30, 1974

[21] Appl. No.: 465,697

[52] U.S. Cl.............. 226/158; 226/196; 279/1 K; 279/1 L
[51] Int. Cl.² ........................................ B65H 17/36
[58] Field of Search ........... 226/148, 149, 151, 162, 226/158, 167, 147, 196; 279/1 K, 1 L

[56] References Cited
UNITED STATES PATENTS

| | | |
|---|---|---|
| 1,885,224 | 11/1932 | Brinkman .......................... 226/149 |
| 2,250,088 | 7/1941 | Baxendale ......................... 226/151 |
| 2,895,740 | 7/1959 | Parsons ........................... 226/158 X |
| 3,125,913 | 3/1964 | Smrekar ........................... 226/149 X |

*Primary Examiner*—Richard A. Schacher
*Attorney, Agent, or Firm*—Baldwin, Egan, Walling & Fetzer

[57] ABSTRACT

A stock feed keyed pusher tube and collet assembly for an automatic screw machine having a coacting key and slot structure on the collet and tube, respectively, for circumferentially aligning the tube with the collet enabling non-circular elongated stock, such as hexagonal stock, to be automatically fed through the assembly.

2 Claims, 7 Drawing Figures

KEYED PUSHER TUBE AND COLLET ASSEMBLY

This invention relates to automatic screw machines and more particularly to the pusher tube and collet assembly therein.

In automatic screw machines, elongated stock is fed through the machine by a pusher tube and collet assembly. Such assembly includes a collet with a pusher tube telescoped therein, the pusher tube being free to move longitudinally (a limited amount) and circumferentially in the collet. The stock is positioned in coacting longitudinal bores of the tube and collet, whereby the tube and collet assembly feed the stock through the automatic screw machine in a manner well known in the art. When circular stock is used, there is no problem in the circumferential alignment of the tube and collet bores. However, when any non-circular stock is used, such as hexagonal stock, a serious problem occurs in effecting circumferential alignment of the tube and collet bores. In fact, severe machine damage involving losses of thousands of dollars is a most common occurrence resulting from such circumferential misalignment.

Therefore, it is an object of the invention to provide an automatic screw machine pusher tube and collet assembly having automatic circumferential alignment of the tube and collet bores.

A further object of the invention is to provide an automatic screw machine pusher tube and collet assembly of the above type that is simple in construction, inexpensive to manufacture, and highly effective in operation.

Briefly, the foregoing objects are accomplished by the provision of a stock feed pusher tube and collet assembly positionable in a spindle of an automatic screw machine for feeding stock through the machine. The assembly includes an elongated pusher tube having a longitudinal open-ended bore of predetermined non-circular configuration in transverse section. The pusher tube is telescoped into the collet for longitudinal and circumferential sliding movement therein. The collet has an open-ended bore of such predetermined non-circular configuration in transverse section. Coacting releasable locking means in the form of a key-slot structure on the tube and collet for circumferentially locking the collet and the tube in a preselected position is provided, whereby the tube bore and the collet bore are aligned circumferentially enabling associated elongated stock having such predetermined non-circular configuration (such as hexagonal stock) to be fed through the coacting tube and collet.

Other objects and advantages of the invention will be apparent from the following description taken in conjunction with the drawings wherein.

Figure 1:
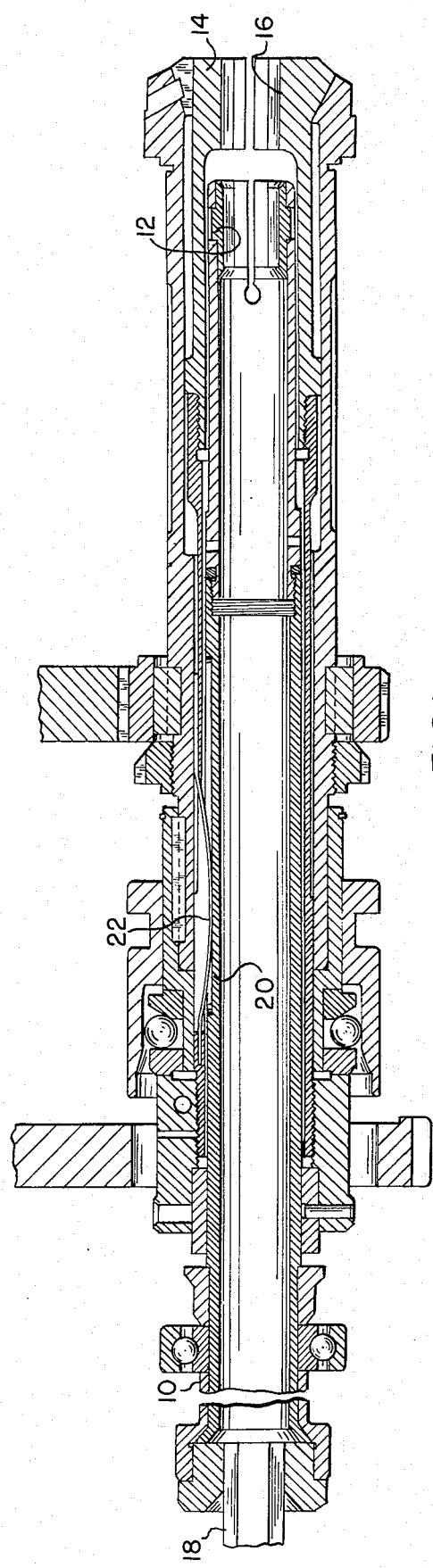
FIG. 1 is a front elevational sectional view of an automatic screw machine pusher tube and collet assembly of the invention.
Figure 2:
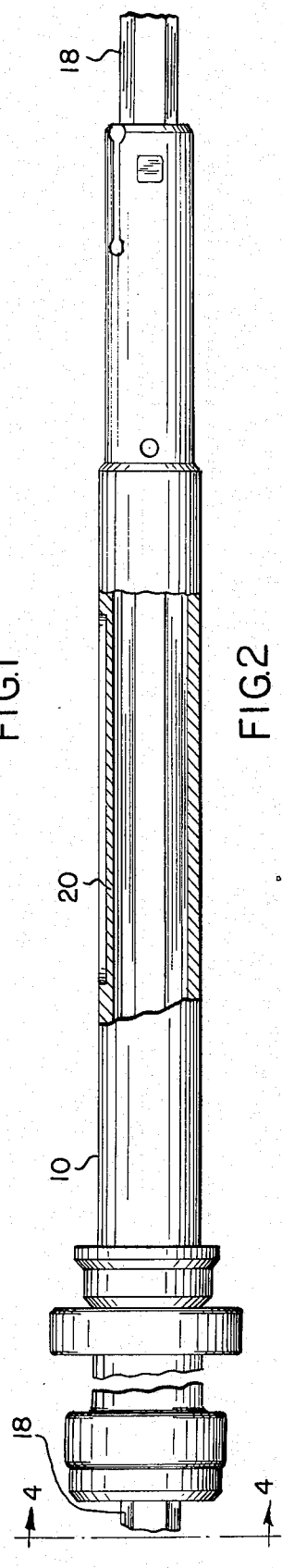
FIG. 2 is a front elevational view, partly in section, of the pusher tube shown in FIG. 1.
Figure 3:
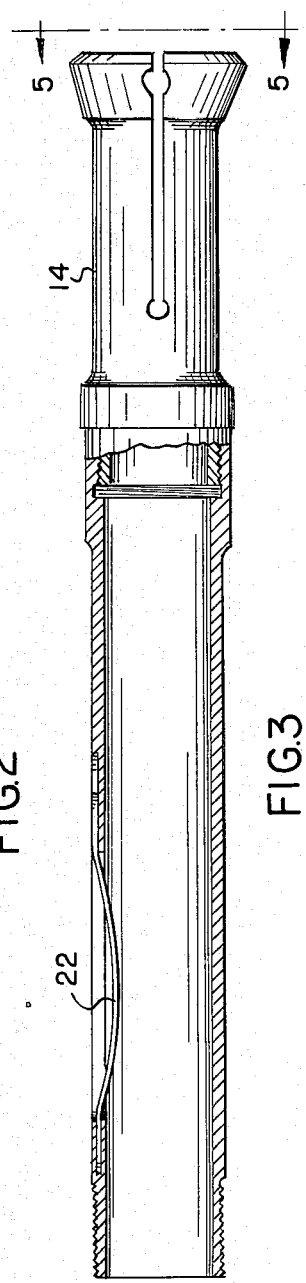
FIG. 3 is a front elevational view, partly in section, of the collet shown in FIG. 1.
Figure 5:
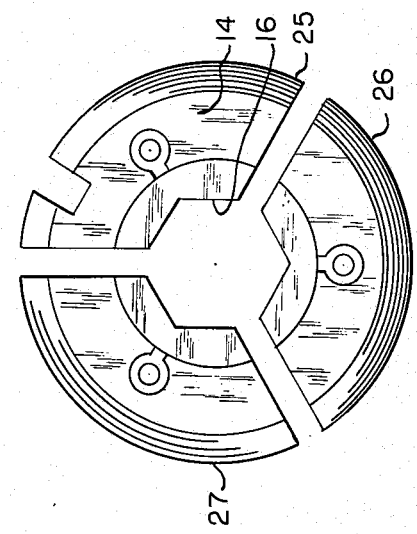
FIG. 5 is a view taken along the line 5—5 of FIG. 3.
Figure 6:
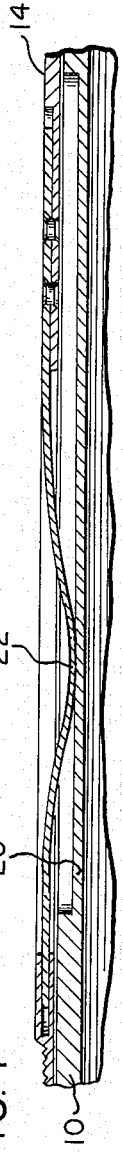
FIG. 6 is an enlarged sectional view of the pusher tube-collet key-slot structure of FIG. 1.
Figure 7:
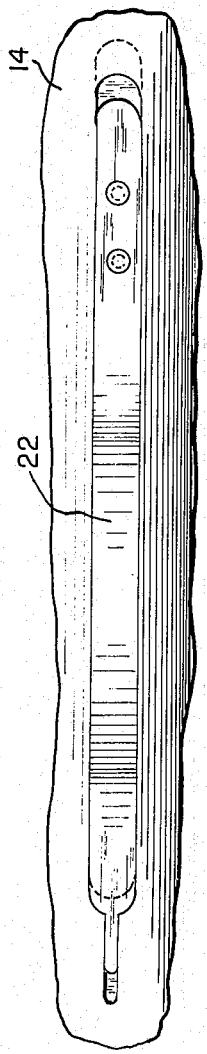
FIG. 7 is a top view of the collet key shown in FIG. 3.
Figure 4:
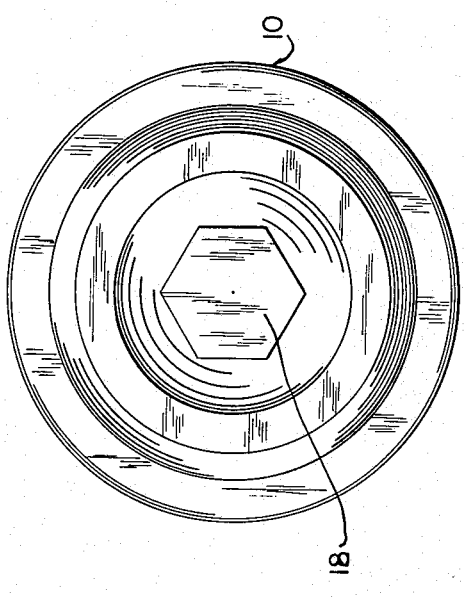
FIG. 4 is a view taken along the line 4—4 of FIG. 2, with the stock omitted.

Referring to the drawings, there is shown a stock feed pusher tube and collet assembly of the invention for feeding stock through an automatic screw machine. The tube and collet assembly includes an elongated pusher tube 10 having a longitudinal open-ended bore 12 of predetermined non-circular configuration in transverse section such as, for example, hexagonal as shown. An elongated collet 14 is provided whereby the pusher tube is telescoped into the collet for longitudinal and circumferential sliding movement therein. The collet 14 has an open-ended bore 16 of such predetermined non-circular (hexagonal) configuration in transverse section.

Coacting releasable locking means on the tube 10 and the collet 14 are provided for circumferentially locking the collet and the tube in a preselected circumferential position, whereby the tube bore 12 and the collet bore 16 are aligned circumferentially enabling associated elongated stock 18 having such predetermined non-circular (hexagonal) configuration to be fed through the coacting tube and collet. More specifically, the pusher tube 10 is provided with a longitudinal key slot 20, and the collet has a coacting resilient longitudinal key 22 releasably positionable in the pusher tube slot 20 to align the tube and collet circumferentially.

An operator places stock 18 into the left end (FIG. 1) of the pusher tube 10. The pusher tube bore 12 is dimensioned to retain the stock 18 therein with a rather tight, snug, yet sliding fit. The stock 10 is fed from left to right through the automatic screw machine. The collet 14 is fixed. The pusher tube 10 is free to move longitudinally in the collet 14 a limited distance. The pusher tube 10 also is normally free to move circumferentially in the collet, but with the present invention, such pusher tube is locked in a preselected circumferential position in the collet so that the pusher tube and collet bores are circumferentially aligned and the hexagonal stock 18 freely passes through the hexagonal pusher tube bore 12 and the hexagonal collet tube bore 16. Before the present invention, the pusher tube, in usual operation could rotate in the collet. As hexagonal (for example) stock was fed through, it would often jam on the collet because of misalignment of the bores 12 and 16 causing severe damage. The key 22-slot 20 structure prevents this from happening.

In operation, the collet 14 is fixed. The pusher tube 10 moves in and out of the collet. As aforementioned, the pusher tube has a tight, but predeterminably releasable sliding grip on the hexagonal stock 18 and thus feeds it through the collet hexagonal bore 16. When the correct length of stock 18 is fed through the collet, the collet jaws 25, 26, 27 are actuated and grip the stock. At this time, the pusher tube moves to the left (the stock being held stationary by the collet as the collet grips the stock with a much greater force than does the pusher tube) to the beginning stroke position, as which time the collet jaws release and the cycle starts over.

The terms and expressions which have been used are used as terms of description and not of limitation, and there is no intention in the use of such terms and expressions of excluding any equivalents of any of the features shown or described, or any portions thereof, and it is recognized that various modifications are possible within the scope of the invention claimed.

What is claimed is:

1. A stock feed pusher tube and collet assembly positionable in a spindle of an automatic screw machine for feeding stock through the machine, said assembly comprising: an elongated pusher tube having a longitudinal open-ended bore of predetermined non-circular configuration in transverse section; an elongated collet, the pusher tube being telescoped within the collet for longitudinal and circumferential sliding movement therein, said collet having an open-ended bore of said predetermined non-circular configuration in transverse section; and coacting releasable locking means on the tube and collet for circumferentially locking the tube in the collet in a preselected position, whereby the tube bore and the collet bore are aligned circumferentially enabling associated elongated stock having said predetermined non-circular configuration to be fed through the coacting tube and collet, and wherein said locking means includes a key-slot structure wherein the tube has a longitudinal key slot, and said collet has a coacting resilient key releasably positionable in said slot to align and releasably lock the tube and collet circumferentially.

2. The structure of claim 1 wherein the transverse non-circular configuration of the bores and associated stock is hexagonal.

* * * * *